United States Patent
Ando

(10) Patent No.: US 7,970,536 B2
(45) Date of Patent: Jun. 28, 2011

(54) NAVIGATION SYSTEM

(75) Inventor: Kenji Ando, Hitachinaka (JP)

(73) Assignee: Xanavi Informatics Corporation, Zama-shi (JP)

( * ) Notice: Subject to any disclaimer, the term of this patent is extended or adjusted under 35 U.S.C. 154(b) by 195 days.

(21) Appl. No.: 11/830,355

(22) Filed: Jul. 30, 2007

(65) Prior Publication Data

US 2008/0027638 A1 Jan. 31, 2008

(30) Foreign Application Priority Data

Jul. 31, 2006 (JP) .................................. 2006-208250

(51) Int. Cl.
*G01C 21/34* (2006.01)

(52) U.S. Cl. ........................................................ 701/209

(58) Field of Classification Search .................... 701/209
See application file for complete search history.

(56) References Cited

U.S. PATENT DOCUMENTS

| | | | | | |
|---|---|---|---|---|---|
| 5,452,212 | A | * | 9/1995 | Yokoyama et al. | 701/211 |
| 5,452,217 | A | * | 9/1995 | Kishi et al. | 701/207 |
| 5,559,511 | A | * | 9/1996 | Ito et al. | 340/995.21 |
| 6,266,613 | B1 | * | 7/2001 | Nimura et al. | 701/210 |
| 6,321,158 | B1 | * | 11/2001 | DeLorme et al. | 701/201 |
| 2004/0049340 | A1 | * | 3/2004 | Usui | 701/209 |

FOREIGN PATENT DOCUMENTS

| | | | |
|---|---|---|---|
| JP | 11-23307 | A | 1/1999 |
| JP | 11-37782 | A | 2/1999 |
| JP | 2000-088593 | | 3/2000 |
| JP | 2000-241186 | A | 9/2000 |

OTHER PUBLICATIONS

Japanese Office Action dated Feb. 1, 2011 including English-language translation (Five (5) pages).

* cited by examiner

*Primary Examiner* — John Q Nguyen
*Assistant Examiner* — Kyung J Kim
(74) *Attorney, Agent, or Firm* — Crowell & Moring LLP

(57) ABSTRACT

A navigation system includes: a search unit that executes a search for a route from a start point to a destination; a display unit at which the route determined through the search is displayed together with a roadmap; and a specification unit that specifies a range on the roadmap. If an entrance interchange into an express highway, present on the route determined through the search executed by the search unit and the start point are contained within the range specified via the specification unit, the search unit executes a search within the range to determine a first route from the start point to the entrance interchange present within the range and also executes a search for a second route from the entrance interchange to the destination; and the first route and the second route having been searched by the search unit are displayed at the display unit.

5 Claims, 10 Drawing Sheets

US 7,970,536 B2

NAVIGATION SYSTEM

INCORPORATION BY REFERENCE

The disclosure of the following priority application is herein incorporated by reference: Japanese Patent Application No. 2006-208250 filed Jul. 31, 2006

BACKGROUND OF THE INVENTION

1. Field of the Invention

The present invention relates to a navigation system that allows the user to alter an interchange to be passed through and then re-executes the route search.

2. Description of Related Art

There are automotive navigation systems known in the related art that allow the user to switch the entrance interchange through which the vehicle is to enter an express highway, set on the recommended route to the destination (see, for instance, Japanese Laid Open Patent Publication No. 2000-88593). The user of the navigation system disclosed in the publication switches the entrance interchange by touching the display position of a specific entrance interchange on the map on display.

SUMMARY OF THE INVENTION

While navigation systems in the related art, such as that disclosed in Japanese Laid Open Patent Publication No. 2000-88593, allow the user to select a specific entrance interchange, the user cannot select the roads to take to reach the entrance interchange.

According to the 1st aspect of the present invention, a navigation system comprises: a search unit that executes a search for a route from a start point to a destination; a display unit at which the route determined through the search is displayed together with a roadmap; and a specification unit that specifies a range on the roadmap. If an entrance interchange into an express highway, present on the route determined through the search executed by the search unit and the start point are contained within the range specified via the specification unit, the search unit executes a search within the range to determine a first route from the start point to the entrance interchange present within the range and also executes a search for a second route from the entrance interchange to the destination; and the first route and the second route having been searched by the search unit are displayed at the display unit.

According to the 2nd aspect of the present invention, in the navigation system according to the 1st aspect, it is preferred that the specification unit includes a touch panel disposed on a display screen of the display unit and specifies a range contained in a line drawn by touching the touch panel.

According to the 3rd aspect of the present invention, in the navigation system according to the 1st or the 2nd aspect, it is preferred that if a plurality of interchanges are present in the range, the specification unit specifies an interchange closest to the destination as the entrance interchange.

According to the 4th aspect of the present invention, in the navigation system according to any one of the 1st through 3rd aspects, it is preferred that the search unit searches for the first route by giving preference to regular roads as a search condition.

DESCRIPTION OF PREFERRED EMBODIMENT

Figure 1:
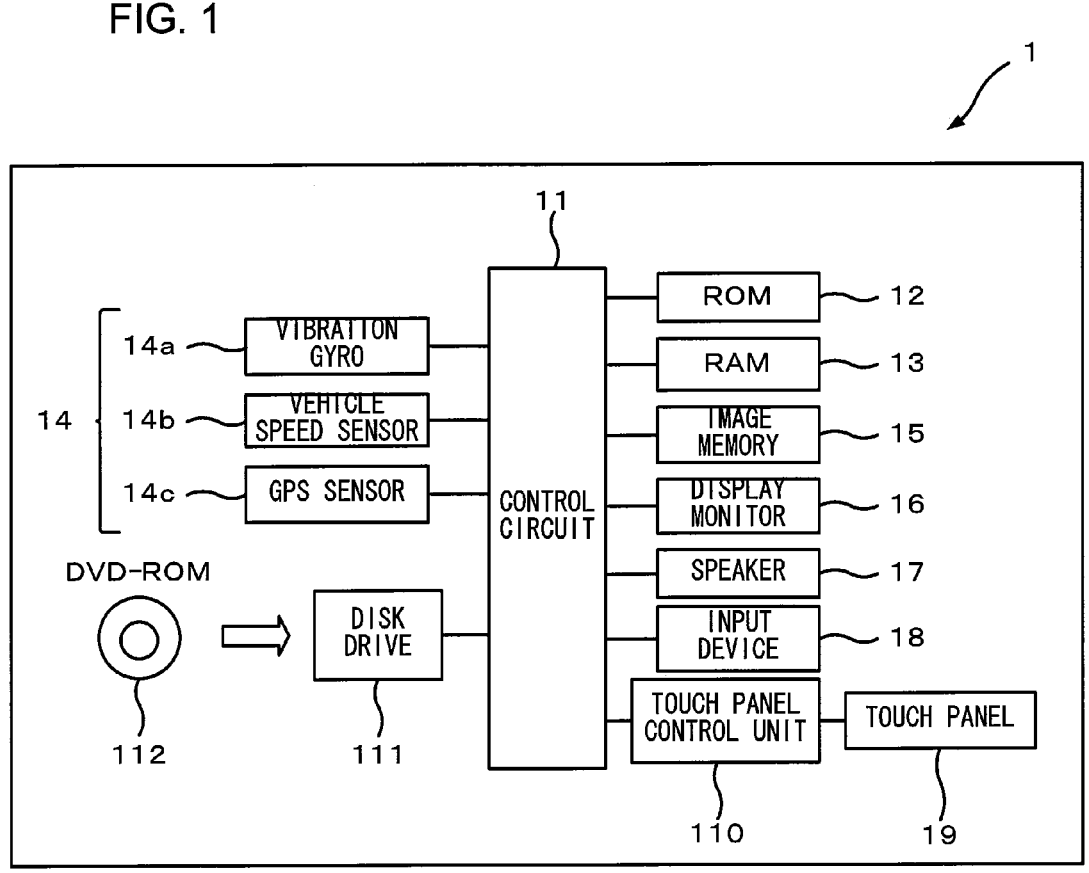
FIG. 1 is a block diagram showing the structure adopted in the navigation system achieved in an embodiment of the present invention.

FIG. 1 shows a navigation system 1 achieved in an embodiment of the present invention. The user of the navigation system 1 is able to specify a reroute search range by defining the range with lines drawn on a map displayed at a display monitor 16. The navigation system 1 comprises a control circuit 11, a ROM 12, a RAM 13, a current position detection device 14, an image memory 15, the display monitor 16, a speaker 17, an input device 18, a touch panel 19 and a disk drive 111. A DVD-ROM 112 having stored therein map data is loaded in the disk drive 111.

The control circuit 11, constituted with a microprocessor and its peripheral circuits, implements various types of control by using the RAM 13 as its work area as it executes a control program stored in the ROM 12. The control circuit 11 executes a specific type of route search processing based upon the map data stored in the DVD-ROM 112 and the processing results are displayed as a recommended route at the display monitor 16.

The current position detection device 14 detects the current position of the subject vehicle. The current position detection device 14 is constituted with a vibration gyro 14a that detects the vehicle advancing direction, a vehicle speed sensor 14b that detects the vehicle speed, a GPS (global positioning system) sensor 14c that detects a GPS signal from a GPS satellite, and the like. Based upon the current vehicle position detected by the current position detection device 14, the navigation system 1 determines a map display area, a route search start point and the like and indicates the current position on the map.

Image data of images to be displayed at the display monitor 16 are stored in the image memory 15. The image data, which include roadmap drawing data and various types of graphic data, are generated as needed based upon the map data stored in the DVD-ROM 112. By using the image data thus generated, the navigation system 1 is able to display a map and the like.

The disk drive 111 reads out map data from the DVD-ROM 112. The map data include map display data and route search data. The map display data and the route search data include link information and node information pertaining to the roads in the map data. The map display data include a plurality of sets of map data each provided at a specific scaling factor among various scaling factors ranging from wide-area to detailed, and the scaling factor for the map display can be adjusted at a request from the user. It is to be noted that the map data may be read out from a recording medium other than the DVD-ROM 112, such as a CD-ROM or a hard disk.

Various types of information including a roadmap of an area around the subject vehicle position are provided as screen display to the user via the display monitor 16 based upon various types of information including the map data. Through the speaker 17, audio messages that provide instructions for various input operations and route guidance are output. The input device 18 includes input switches through which the user is able to set various commands. Such an input device may be an operation panel or a remote control unit. Prompted by instructions displayed on the screen at the display monitor 16 or audio instructions output through the speaker 17, the user manually operates the input device 18 so as to select and set a specific destination.

The touch panel 19 is a transparent touch switch layered over the surface of the display monitor 16 and an image displayed at the display monitor 16 is viewed through the touch panel 19. The touch panel 19 outputs a signal corresponding to an operation position on the touch panel 19 to a touch panel control unit 110, which, in turn, calculates the touch position at the touch panel 19.

As the user presses the display screen at the display monitor 16 the touch panel 19 registers a touch. In response, a destination may be set at the touch position or processing defined in correspondence to the touched button or display menu may be executed.

As a destination is set by the user, the navigation system 1 executes a route calculation based upon a specific algorithm to determine a route to the destination starting from the current position detected via the GPS sensor 14*c*. The route thus determined (hereafter referred to as a recommended route) is indicated on the screen by adopting a specific display mode that makes it possible to distinguish the route from the other roads, e.g., by using a different display color. As a result, the user is able to recognize the recommended route in the map on display with ease. In addition, the navigation system 1 guides the vehicle so as to enable the vehicle to travel along the recommended route by providing the user with visual cues on the screen or audio instructions along the advancing direction.

Figure 2:
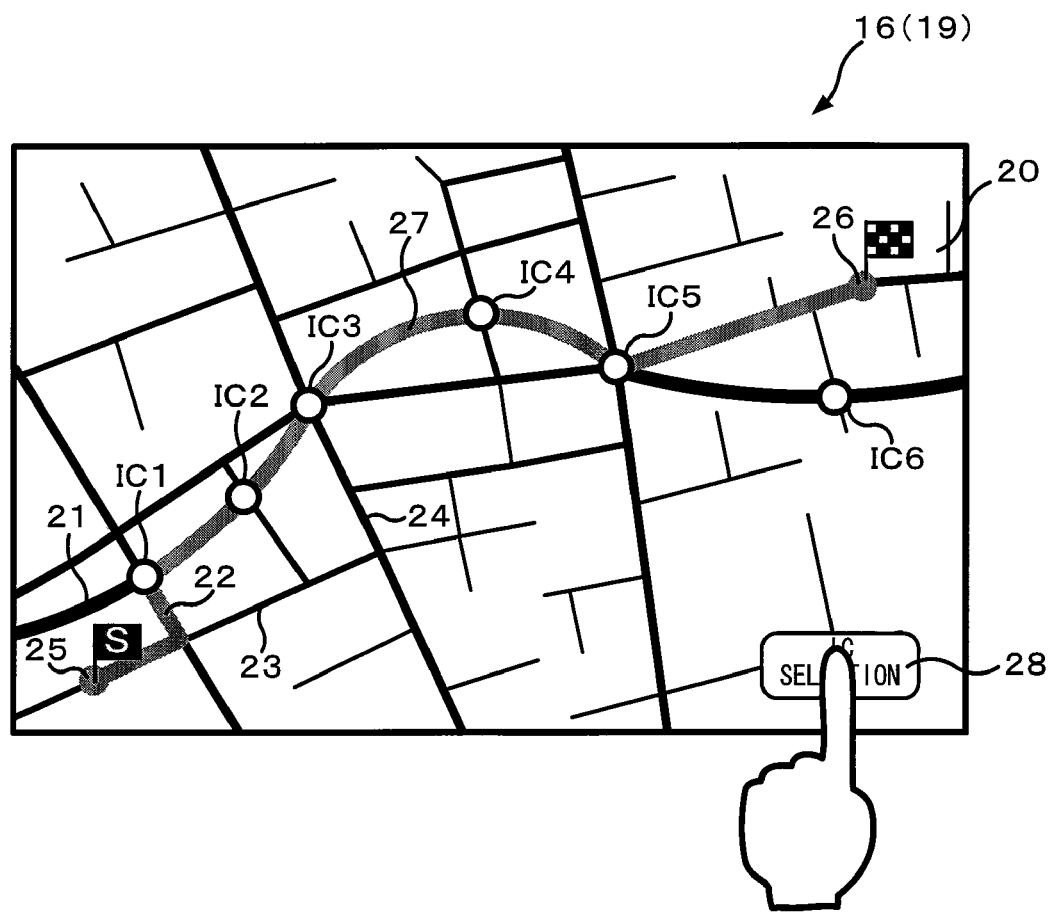
FIG. 2 shows a recommended route display screen brought up at the display monitor.

The operation performed in the navigation system 1 in the embodiment of the present invention to switch the entrance interchange is now explained in reference to FIGS. 2 through 6. FIG. 2 shows a recommended route display screen brought up on the display monitor 16. A map 20 is on display at the display monitor 16. In the map 20, a recommended route 27 determined through a route search executed by setting conditions, such as a start point 25, a destination 26 and a preference for express-highways, is displayed together with an express highway 21, regular roads 22~24 and the like. In addition, interchanges IC 1~IC 6 present on the express highway 21 are also indicated in the map. The vehicle traveling on the recommended route 27 will enter the express highway 21 through the interchange IC 1 to travel to the destination 26. Hereafter, the interchange through which the vehicle enters the express highway 21 is to be referred to as an entrance interchange.

In addition, an IC (interchange) selection button 28 is displayed over the map 20 at the display monitor 16. The IC selection button 28 is used to switch or change the entrance interchange through which the recommended route passes.

The recommended route 27 includes a route segment through which the vehicle will travel on the regular road 22 to reach the interchange IC 1. However, if, for instance, traffic on the regular road 22 is congested and it is therefore likely to take a long time to reach the interchange IC 1 through the regular road 22, the user may wish to select a different entrance interchange. For instance, he is likely to be able to reach the interchange IC 3 faster through the regular road 23 and the regular road 24 with less traffic. Under such circumstances, the user may decide to switch the entrance interchange to the interchange IC 3. Upon making the decision, the user touches the IC selection button 28.

Figure 3:
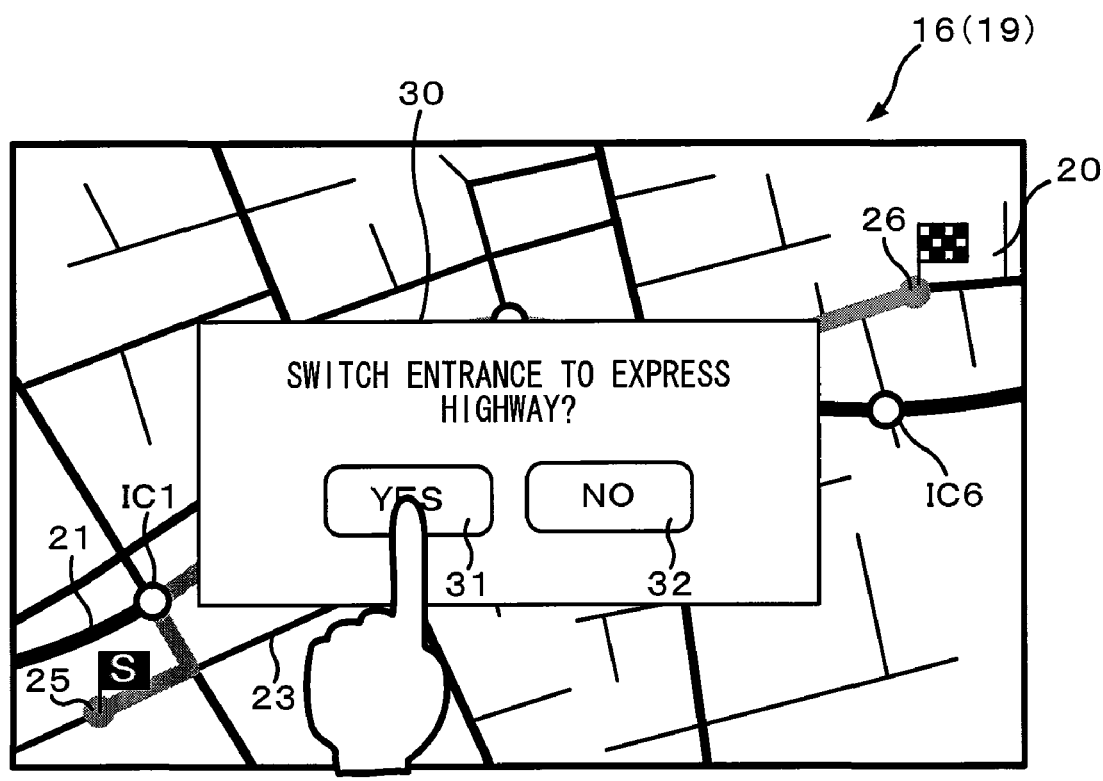
FIG. 3 shows an IC switch verification screen.

FIG. 3 shows a display screen brought up as the user touches the IC selection button 28. As the user touches the IC selection button 28, an IC switch verification screen 30 is brought up on display. An inquiry "Change entrance to express highway?" is displayed in the IC switch verification screen 30. In addition, a YES button 31 and a NO button 32 by which the user enters his answer are displayed. By touching the YES button 31, the user is able to select an entrance interchange and specify an area over which a reroute search for a route to the entrance interchange is to be executed. If the user touches the NO button 32, the display returns to the screen shown in FIG. 2. The following explanation is provided by assuming that the user touches the YES button 31 at this point.

Figure 4:
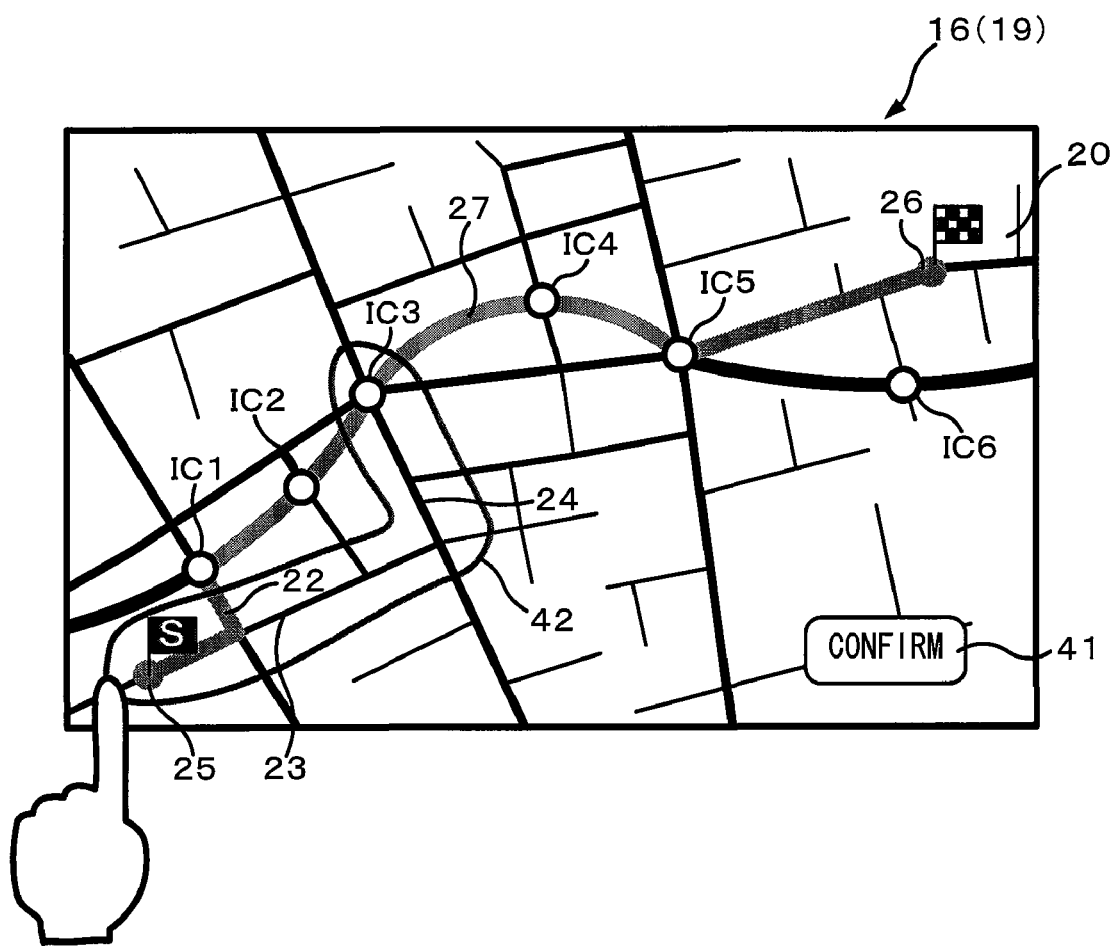
FIG. 4 shows the operation performed to specify an area on the map.

FIG. 4 shows the display screen brought up after the user touches the YES button 31. As the user touches the YES button 31, a confirm button 41 is displayed together with the map 20 in the display screen. The confirm button 41 is touched when the user wishes to confirm a line he has drawn to specify an area 42 on the map. The user draws the line 42 indicating a range containing the start point 25, the regular roads 23 and 24 and the interchange IC 3, as shown in FIG. 4.

Figure 5:
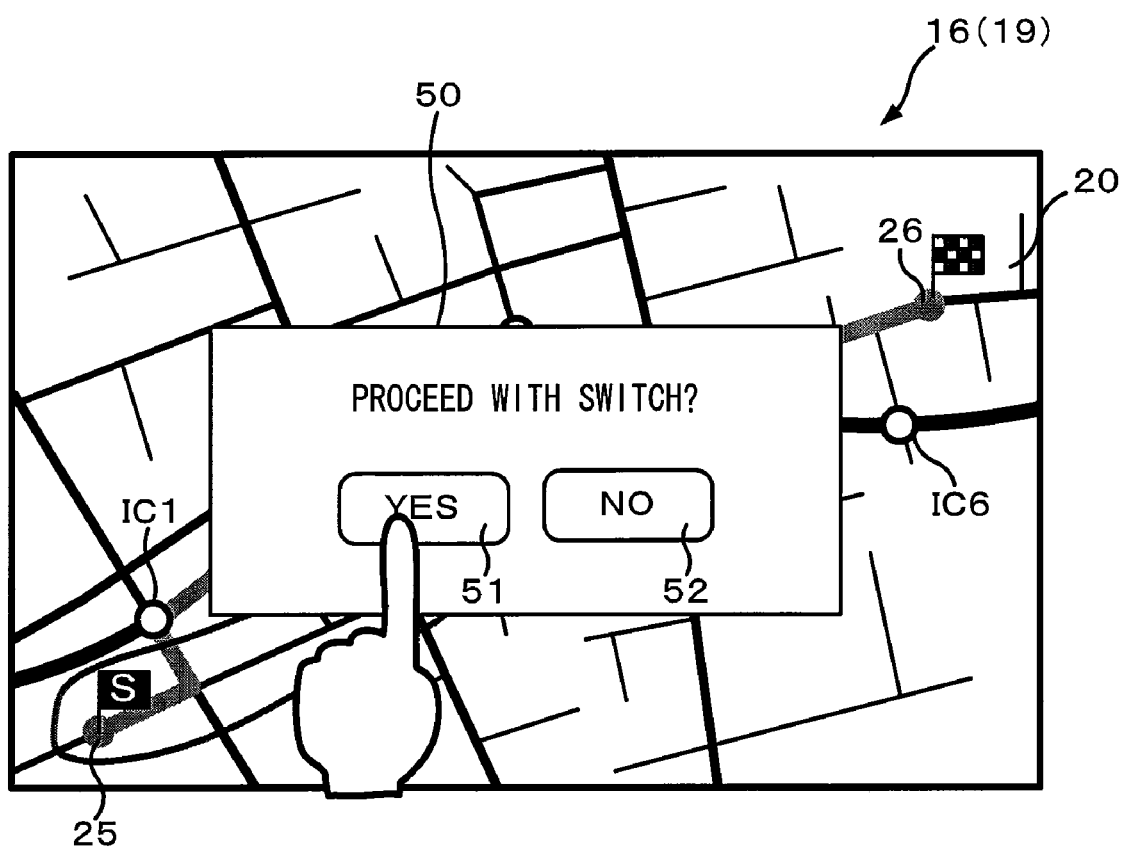
FIG. 5 shows an IC switch verification screen.
Figure 6:
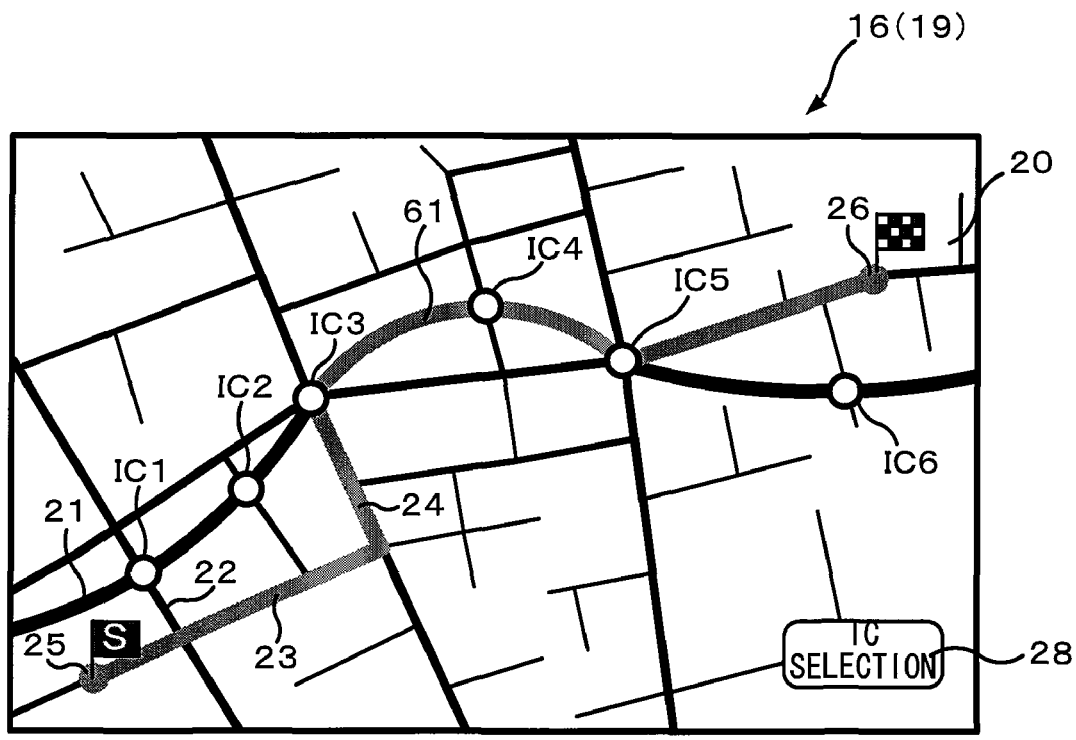
FIG. 6 shows a route determined by re-executing the route search based upon a specified area on the map.

After drawing the line 42, the user touches the confirm button 41. In response, an IC switch verification screen 50 is brought up on display as shown in FIG. 5. In the IC switch verification screen 50, an inquiry "Proceed with switch?" is displayed. In addition, a YES button 51 and a NO button 52 with which the user enters his response are displayed. If the user touches the YES button 51, a route from the start point 25 to the selected entrance interchange IC 3 is searched based upon the links within the specified range by giving preference to regular roads. Once the area 42 is specified, the search is executed by giving preference to regular roads even if the preference for regular roads is not selected as a search condition, e.g., when preference for express highways or toll roads is currently set. Then, a route from the selected entrance interchange IC 3 to the destination 26 is searched. The two routes resulting from the search are connected and displayed as a recommended route 61 on the display screen, as shown in FIG. 6. Then, the user is guided through this recommended route 61. It is to be noted that by touching the NO button 52 in FIG. 5, the user is able to re-specify an area on the map.

Figure 7:
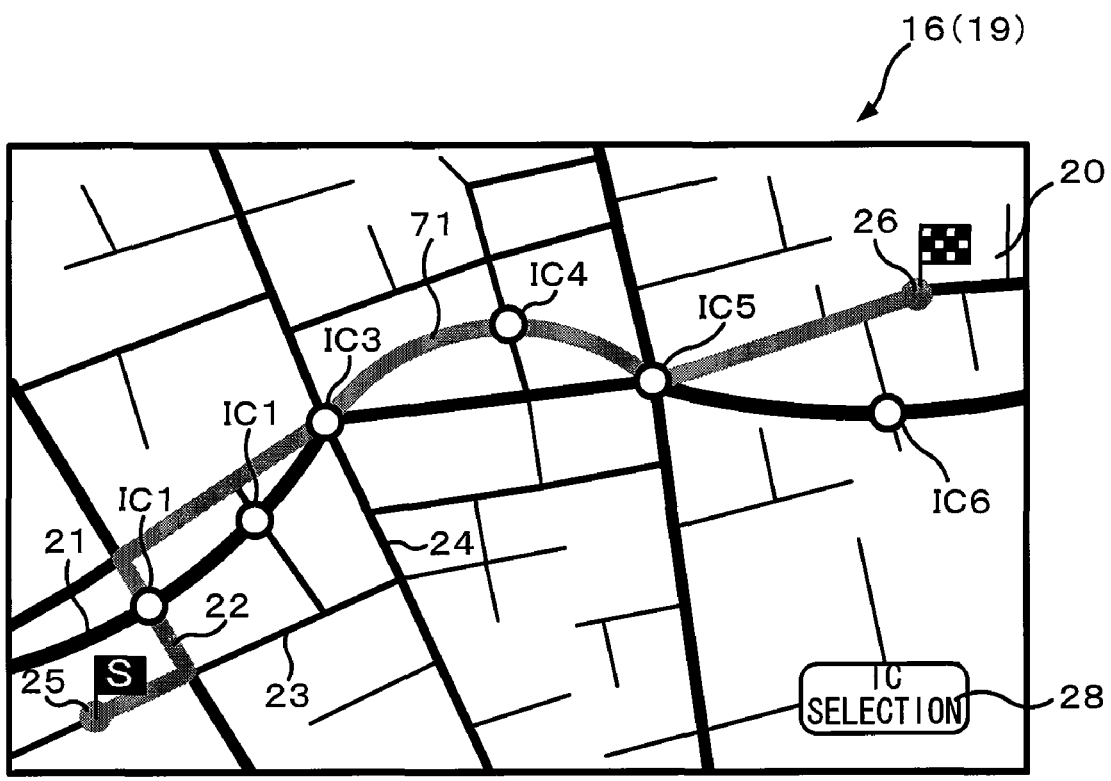
FIG. 7 shows a route determined by pressing a specific interchange display position, thus selecting the corresponding interchange and then re-executing the route search.

If, on the other hand, a different entrance interchange is selected by touching the display position of, for instance, the interchange IC 3 as in the related art, a recommended route 71, on which the vehicle would travel via the regular road 22 to reach the interchange IC 3 will be selected, as shown in FIG. 7, since the distance to the interchange IC 3 through the regular road 22 is shorter than the distance to the interchange IC 3 reached through the regular roads 23 and 24. Having the route shown in FIG. 7 selected through the reroute search is pointless as far as the user is concerned since he wishes to switch the entrance interchange from the interchange IC 1 to the interchange IC 3 in order to avoid traveling on the congested regular road 22.

Figure 8:
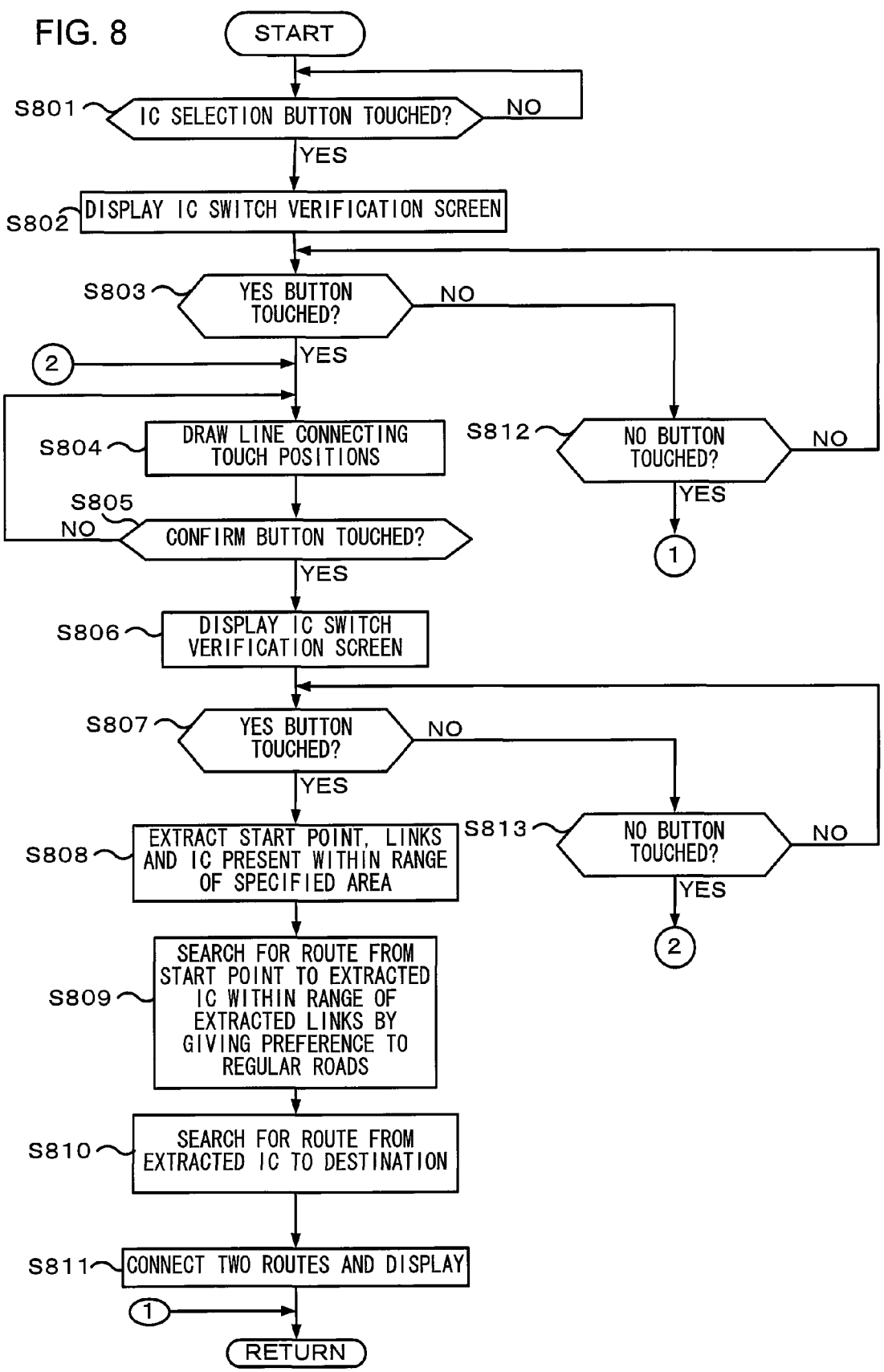
FIG. 8 presents a flowchart of reroute search processing executed in response to a entrance interchange switch in the navigation system in the embodiment of the present invention.

Next, the reroute search processing executed in response to the entrance interchange switch executed in the navigation system 1 in the embodiment of the present invention is explained in reference to the flowchart presented in FIG. 8. The processing in FIG. 8 is executed by the control circuit 11 based upon a program started up as the recommended route resulting from a route search is brought up on display at the display monitor 16.

In step S801, a decision is made as to whether or not the IC selection button 28 has been touched. If the IC selection button has been touched, an affirmative decision is made in step S801 to proceed to step S802. If the IC selection button has not been touched, the processing in step S801 is repeatedly executed. In step S802, the IC switch verification screen 30 is displayed. In step S803, a decision is made as to whether or not the YES button 31 has been touched. If the YES button has been touched, an affirmative decision is made in step S803 to proceed to step S804. If the YES button has not been touched, a negative decision is made in step S803 to proceed to step S812. In step S804, a line is drawn at the touch position on the display screen.

In step S805, a decision is made as to whether or not the confirm button 41 has been touched. If the confirm button has been touched, an affirmative decision is made in step S805 to proceed to step S806. If the confirm button has not been touched, a negative decision is made in step S805 and the operation returns to step S804. In step S806, the IC switch verification screen 50 is brought up on display. In step S807, a decision is made as to whether or not the YES button 51 has been touched. If the YES button has been touched, an affirmative decision is made in step S807 to proceed to step S808. If, on the other hand, the YES button has not been touched, a negative decision is made in step S807 to proceed to step S813.

In step S808, the start point 25, the links and the interchange present within the range of the specified area defined by drawing the line on the map are extracted. The a real range is detected at this time, as explained below. After touching the YES button 31, the user draws the area 42 with his finger, and then touches the confirm button 41. Accordingly, the control circuit 11 detects touch positions on the touch panel 19 during the time period elapsing after detection of a touch of the YES button 31 until detection of a touch on the confirm button 41 and connects the touch positions with rectilinear lines in the order with which they are detected. By connecting the touch position first detected and the touch position detected last through the rectilinear lines, the area 42 is confirmed. The control circuit 11 then extracts the links each having the coordinates of the nodes at the two ends thereof contained within the range. In addition, it extracts the interchange IC 3, the positional coordinates of which are contained within the range. Also, if the positional coordinates of the start point 25 are contained in the range, the control circuit 11 extracts the start point 25 as well. If the entrance interchange is to be switched after departing the start point, the area 42 must be drawn so as to contain the current position. In this case, the current position is regarded as the start point.

In step S809, a route search is executed to determine the route from the start point 25 to the extracted interchange IC 3 based upon the regular road preference search condition. In step S810, the route from the extracted interchange IC 3 to the destination 26 is determined through a search. Instep S811, the two routes resulting from the search are connected and displayed at the display monitor 16.

In step S812, a decision is made as to whether or not the NO button 31 has been touched. If the NO button has been touched, an affirmative decision is made in step S812 and the operation makes a return. If, on the other hand, the NO button has not been touched, a negative decision is made in step S812 and the operation returns to step S803.

In step S813, a decision is made as to whether or not the NO button 51 has been touched. If the NO button has been touched, an affirmative decision is made in step S813 and the operation returns to step S804. If, on the other hand, the NO button has not been touched, a negative decision is made in step S813 and the operation returns to step S807.

The following advantages are achieved in the navigation system 1 in the embodiment described above.

(1) The range 42 containing the entrance interchange IC 3, which the user wishes to select, and routes from the start point to the entrance interchange IC 3, is specified and then a search is executed to determine the route from the start point to the entrance interchange IC 3. Thus, the preferred roads 23 and 24 on which the user wishes to travel to reach the entrance interchange IC 3, as well as the entrance interchange IC 3 itself, can be selected.

(2) The route search range 42 can be specified by dragging the finger to draw a line defining the range at the display monitor 16. Thus, the search range 42 over which the route to the entrance interchange is to be searched can be specified when the preferred entrance interchange is selected. In other words, the road range for the route search can be specified freely with ease. If the entrance interchange is selected simply by touching the display position of the interchange IC 3, as in the related art, the user needs to perform an additional task of specifying a way point to indicate a preferred route to the selected entrance interchange and thus, the operation is bound to be more time-consuming.

The navigation system 1 achieved in the embodiment allows for the following variations.

Figure 9:
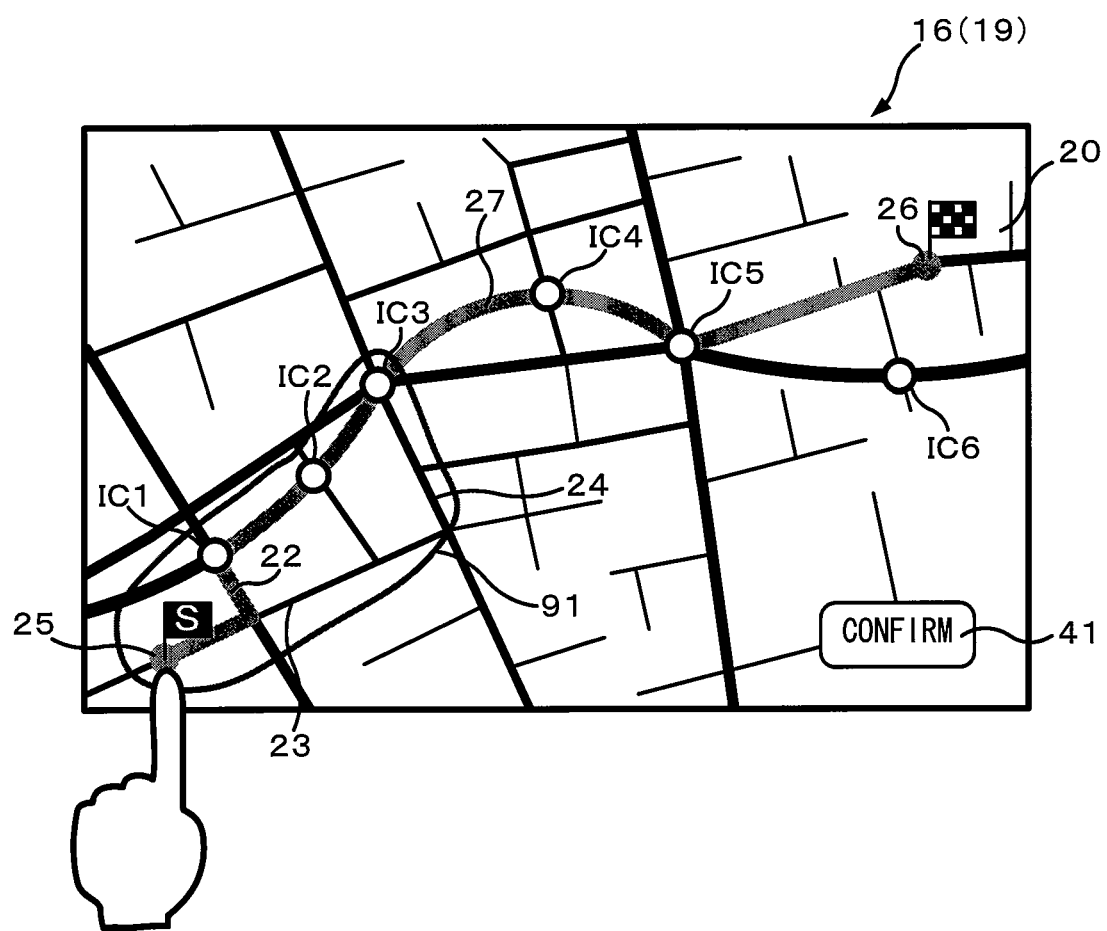
FIG. 9 shows an operation that may be performed to specify an area on the map in a variation of the embodiment of the present invention.

(1) If an area containing a plurality of interchanges is specified on the map, the interchange closest to the destination will be selected as the entrance interchange. For instance, if a line 91 defining an area containing the interchanges IC 1~IC 3 has been drawn, as shown in FIG. 9, the interchange IC 3 closest to the destination may be selected. Through this method, the entrance interchange IC 3 can be specified and the reroute search range for determining the route to the entrance interchange IC 3 can be selected simply by drawing the line 91 which is simpler than the line 42 shown in FIG. 4.

Figure 10:
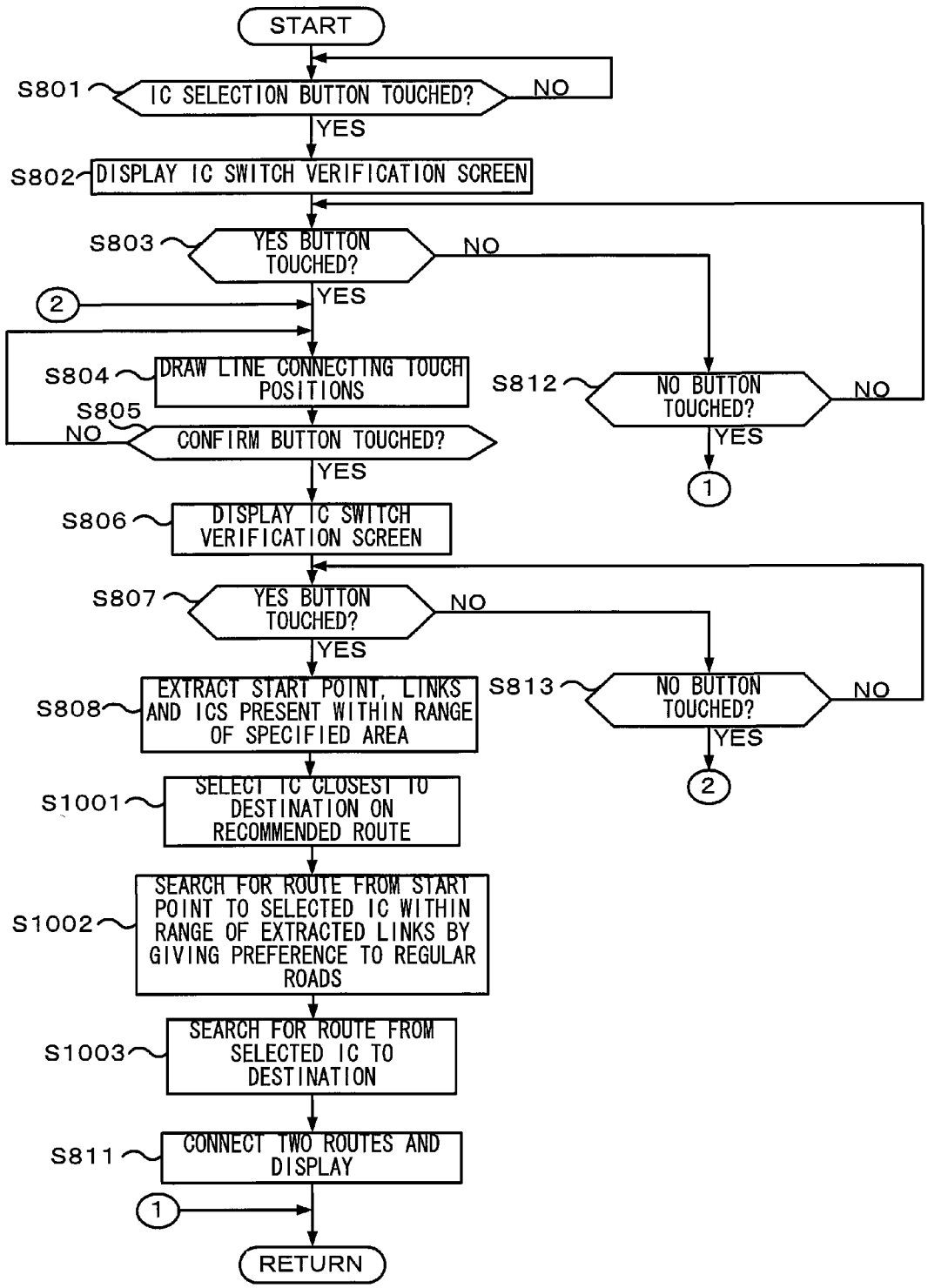
FIG. 10 presents a flowchart of the reroute search processing executed in response to a entrance interchange switch in the navigation system in the variation of the embodiment of the present invention.

Reroute search processing that may be executed by adopting this method is now explained in reference to the flowchart presented in FIG. 10. The same step numbers are assigned to steps in which processing identical to that executed in the embodiment of the present invention is executed and the following explanation focuses on differences from the embodiment. As is the processing executed in the embodiment, the processing in FIG. 10 is executed by the control circuit 11 based upon a program started up as the recommended route resulting from a route search is brought up on display at the display monitor 16.

In step S808, the start point 25, the links and the interchanges IC 1~IC 3 present within the range specified by drawing the line on the map are extracted and then the operation proceeds to step S1001. In step S1001, the interchange closest to the destination 26 on recommended route among the extracted interchanges IC 1~IC 3 is selected. In step S1002, the route from the start point 25 to the selected interchange among the interchanges IC 1~IC 3 is searched by giving preference to, for instance, regular roads over the range containing the extracted links. In step S1003, a search is executed to determine the route from the selected interchange to the destination 26. Then, the operation proceeds to step S811.

(2) A route search may be executed by designating the current vehicle position as the start point. In other words, the start point 25 may be the current vehicle position. In such a case, the line 42 is drawn so as to include the current vehicle position in the defined range.

(3) While an explanation is given above in reference to the embodiment on an example in which the present invention is adopted when switching interchanges to express highways, the present invention is not limited to this example. For instance, the present invention may be adopted in conjunction with interchanges to toll roads or vehicle-only roads. Namely, the present invention may be adopted in conjunction with all types of roads that are entered through interchanges. In addition, the term "interchange" is used as an equivalent to an entrance through which the vehicle enters a road distinguishable from regular roads, such as an express highway, a toll road or a vehicle-only road, from a regular road.

(4) The navigation system 1 may further comprise a device that obtains road traffic information on traffic jams and the like, and may display road traffic information on the map based upon the obtained information. For instance, it may include a light beacon device, a radio beacon device, an FM multiplex reception device or the like to obtain the road traffic information. The user of such a navigation system is able to specify a range by avoiding roads with heavy traffic based upon traffic jam information displayed over the roadmap.

(5) The control program executed in the navigation system 1 may be installed in a personal computer so as to enable the personal computer to function as a navigation system. In such a case, the control program, which will enable the personal computer to function as a navigation system, may be provided via a recording medium such as a DVD or a CD-ROM or through a data signal on the Internet or the like. In other words, the control program, which enables the personal computer to function as a navigation system achieving the features described above, can be distributed as a computer-readable computer program product adopting any of various modes including a recording medium, a data signal and a carrier wave. The personal computer to function as a navigation system must be equipped with a touch panel disposed over the display screen.

The above described embodiment is an example and various modifications can be made without departing from the scope of the invention.

What is claimed is;

1. A navigation system, comprising:
   a search unit that executes a search for a route from a start point to a destination, wherein the route enters an express highway through a first entrance;
   a display unit at which the route determined through the search is displayed together with a roadmap; and
   a specification unit that specifies an area on the roadmap according to a user's designation, wherein:
   if a new entrance into the express highway, which is different from the first entrance, and the start point are contained within the area specified via the specification unit, the search unit executes a search to determine a first route from the start point to the new entrance traveling only within the area specified via the specification unit and also executes a search for a second route from the new entrance to the destination;
   the first route and the second route having been searched by the search unit are displayed at the display unit; and
   the specification unit includes a touch panel disposed on a display screen of the display unit and specifies the area contained in a line drawn by the user by touching the roadmap on the touch panel.

2. A navigation system according to claim 1, wherein:
   if a plurality of entrances into the express highway are present in the area, the specification unit specifies an entrance closest to the destination to enter the express highway.

3. A navigation system according to claim 1, wherein:
   the search unit searches for the first route by giving preference to regular roads as a search condition.

4. A navigation system according to claim 2, wherein:
   the search unit searches for the first route by giving preference to regular roads as a search condition.

5. A navigation system according to claim 1, wherein:
   the start point includes a current position.

\* \* \* \* \*